US007246146B1

(12) United States Patent
Ims et al.

(10) Patent No.: US 7,246,146 B1
(45) Date of Patent: Jul. 17, 2007

(54) LEGACY HOST SYSTEM HOT LINK MODELING AND NAVIGATION

(75) Inventors: Steven D. Ims, Apex, NC (US); Yongcheng Li, Raleigh, NC (US); Yih-Shin Tan, Raleigh, NC (US); Brian Webb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 09/442,791

(22) Filed: Nov. 18, 1999

(51) Int. Cl.
*G06F 15/16* (2006.01)

(52) U.S. Cl. ............... 709/203; 709/217; 709/246; 715/851

(58) Field of Classification Search ............... 709/216, 709/217, 246, 230, 203, 225–229; 715/851, 715/854–855
See application file for complete search history.

(56) References Cited

U.S. PATENT DOCUMENTS

| 5,867,153 | A  | * | 2/1999  | Grandcolas et al. ......... 705/39 |
| 5,940,075 | A  | * | 8/1999  | Mutschler et al. .......... 345/760 |
| 5,958,016 | A  | * | 9/1999  | Chang et al. .............. 709/229 |
| 5,968,119 | A  |   | 10/1999 | Stedman et al. ............ 709/219 |
| 6,014,702 | A  | * | 1/2000  | King et al. ................ 709/227 |
| 6,055,538 | A  | * | 4/2000  | Kessenich et al. .......... 707/101 |
| 6,167,441 | A  | * | 12/2000 | Himmel ..................... 709/217 |
| 6,209,124 | B1 | * | 3/2001  | Vermeire et al. ........... 717/114 |
| 6,216,101 | B1 | * | 4/2001  | Butts et al. ............... 703/27 |
| 6,229,534 | B1 | * | 5/2001  | Gerra et al. ............... 345/733 |
| 6,233,543 | B1 | * | 5/2001  | Butts et al. ............... 703/27 |
| 6,237,040 | B1 | * | 5/2001  | Tada ....................... 709/246 |
| 6,256,666 | B1 | * | 7/2001  | Singhal .................... 709/217 |
| 6,260,050 | B1 | * | 7/2001  | Yost et al. ................ 715/501.1 |
| 6,356,924 | B2 | * | 3/2002  | Mullen-Schultz ........... 715/539 |
| 6,363,398 | B1 | * | 3/2002  | Andersen .................. 707/103 R |
| 6,401,131 | B1 | * | 6/2002  | Haverstock et al. ......... 709/246 |
| 6,412,008 | B1 | * | 6/2002  | Fields et al. .............. 709/228 |
| 6,446,110 | B1 | * | 9/2002  | Lection et al. ............. 709/203 |
| 6,449,640 | B1 | * | 9/2002  | Haverstock et al. ......... 709/219 |
| 6,453,353 | B1 | * | 9/2002  | Win et al. ................. 709/229 |
| 6,484,176 | B1 | * | 11/2002 | Sealand et al. ............. 707/10 |
| 6,532,463 | B1 | * | 3/2003  | Robbins et al. ............. 707/9 |

OTHER PUBLICATIONS

"WWW-Zugriff auf IBM 3270- Applikationen", URL: monitor.co.at/monitor/696/storys/simware.htm, retrieved Jun. 6, 2005.

* cited by examiner

*Primary Examiner*—Bharat Barot

(57) ABSTRACT

A method and apparatus for navigating screens in a legacy host system. In a preferred embodiment, requests for specific legacy host screens are received by a server. The server then navigates to the appropriate screen within the legacy host system and retrieves the host screen. Any intermediate screens navigated by the server in reaching the host screen are not displayed to the user. If variable data need be entered to access the host screen, the server sends the user a submittable form on which to enter the appropriate information, which, once entered and sent to the server, is used by the server to retrieve the host screen. Once the host screen has been retrieved, the server formats it into a web page format using a hypertext language and sends the screen to the user. Other screens within the legacy host system are accessed by user selection of selectable links displayed to the user.

30 Claims, 11 Drawing Sheets

300
Client

400

```xml
<screen name="Callup.main" transient="false" entryscreen="false" exitscreen="false">
   <description>
      <oia status="NOTINHIBITED" />
      <string value="Callup" />
   </description>
   <nextscreens>
      <nextscreen name="Ready">
         <input value="[pf3]" />
      </nextscreen>
      <nextscreen name="Callup.result.main">
         <prompt name="Search Name" row="8" col="32" len="35" clearfield="true" />
         <input value="[enter]" />
      </nextscreen>
   </nextscreens>
</screen>
```
⎫ 708

```xml
<screen name="Callup.result.main" transient="false" entryscreen="false" exitscreen="false">
   <description>
      <oia status="NOTINHIBITED" />
      <string value="Callup" />
   </description>
   <nextscreens>
      <nextscreen name="Callup.result.address">
         <input value="a[enter]" />
      </nextscreen>
      <nextscreen name="Callup.main">
         <input value="[pf12]" />
      </nextscreen>
   </nextscreens>
   <comment>
      Note: the callup address result screen is not included in this macro for brevity's sake.
   </comment>
</screen>
```
⎫ 710

```xml
<screen name="Puborder.exit" transient="true" entryscreen="false" exitscreen="false">
   <description>
      <oia status="NOTINHIBITED" />
      <cursor row="9" col="14" />
      <string value="Exit Puborder" />
   </description>
   <actions>
      <input value="1[enter]" />
   </actions>
</screen>
```
⎫ 712

Figure 7B

```
<screen name="Need Enter" transient="true" entryscreen="false" exitscreen="false">
   <description>
      <oia status="NOTINHIBITED" />
      <string value="ENTER to continue..." />
   </description>
   <actions>
      <input value="[enter]" />
   </actions>
</screen>
```
⎫
⎬ 714
⎭

```
<screen name="MORE" transient="true" entryscreen="false" exitscreen="false">
   <description>
      <oia status="NOTINHIBITED" />
      <string value="MORE..." />
   </description>
   <actions>
      <input value="[clear]" row="0" col="0" movecursor="false" xlatehostkeys="true" />
   </actions>
</screen>
```
⎫
⎬ 716
⎭

```
<screen name="HOLDING" transient="true" entryscreen="false" exitscreen="false">
   <description>
      <oia status="NOTINHIBITED" />
      <string value="HOLDING..." />
   </description>
   <actions>
      <input value="[clear]" row="0" col="0" movecursor="false" xlatehostkeys="true" />
   </actions>
</screen>

</HASCRIPT>
```
⎫
⎬ 718
⎭

LEGACY HOST SYSTEM HOT LINK MODELING AND NAVIGATION

BACKGROUND OF THE INVENTION

1. Technical Field

The present invention relates generally to computer software and, more specifically, to methods of presenting an Internet style hot linking system to access legacy host system datastream screens.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser. The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

However, many computer resources were written before the Internet had become a cultural fixture and without contemplating adaptation of the application, service or data to an Internet connected world. Thus, many computer services (legacy host systems) to which users desire access must be reformatted such that they are readable and useable by web browsers, since this is one of the most convenient and common methods of accessing information via the Internet.

Even with reformatting, however, users were required to be trained or otherwise be familiar with the particular commands necessary to navigate through the various screens contained within these legacy host systems. If users desire access to several or many of these systems, remembering the commands associated with each system becomes burdensome. Furthermore, many people may desire one time or occasional access to systems. Thus, knowledge of the particular commands is even more burdensome to these people. Therefore, a method of accessing and navigating through various screens of a legacy host system without requiring knowledge of service specific commands is desirable. Furthermore, it is desirable to have such a system that is compatible with currently available browsers and uses a system of graphically displayed hyperlinks to which most users have grown accustomed.

SUMMARY OF THE INVENTION

The present invention provides a method and apparatus for navigating screens in a legacy host system. In a preferred embodiment, requests for specific legacy host screens are received by a server. The server then navigates to the appropriate screen within the legacy host system and retrieves the host screen. If there are intermediate screens which need to be navigated to get to the host screen, the server does so, but does not send these intermediate screens to the user if not needed by the user, thus saving bandwidth and time for the user. If variable data need be entered to access the host screen, the server sends the user a submittable form on which to enter the appropriate information, which, once entered and sent to the server, is used by the server to retrieve the host screen. Once the host screen has been retrieved, the server formats it into a web page format using a hypertext language such as extensible markup language (XML) or hypertext markup language (HTML) and sends the screen to the user. Selectable links are displayed to the user to allow the user to request other screens within the legacy host system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A-7C depict an example of a macro for navigating to various screens within a legacy host system in accordance with the present invention;

DETAILED DESCRIPTION OF THE PREFERRED EMBODIMENT

Figure 1:
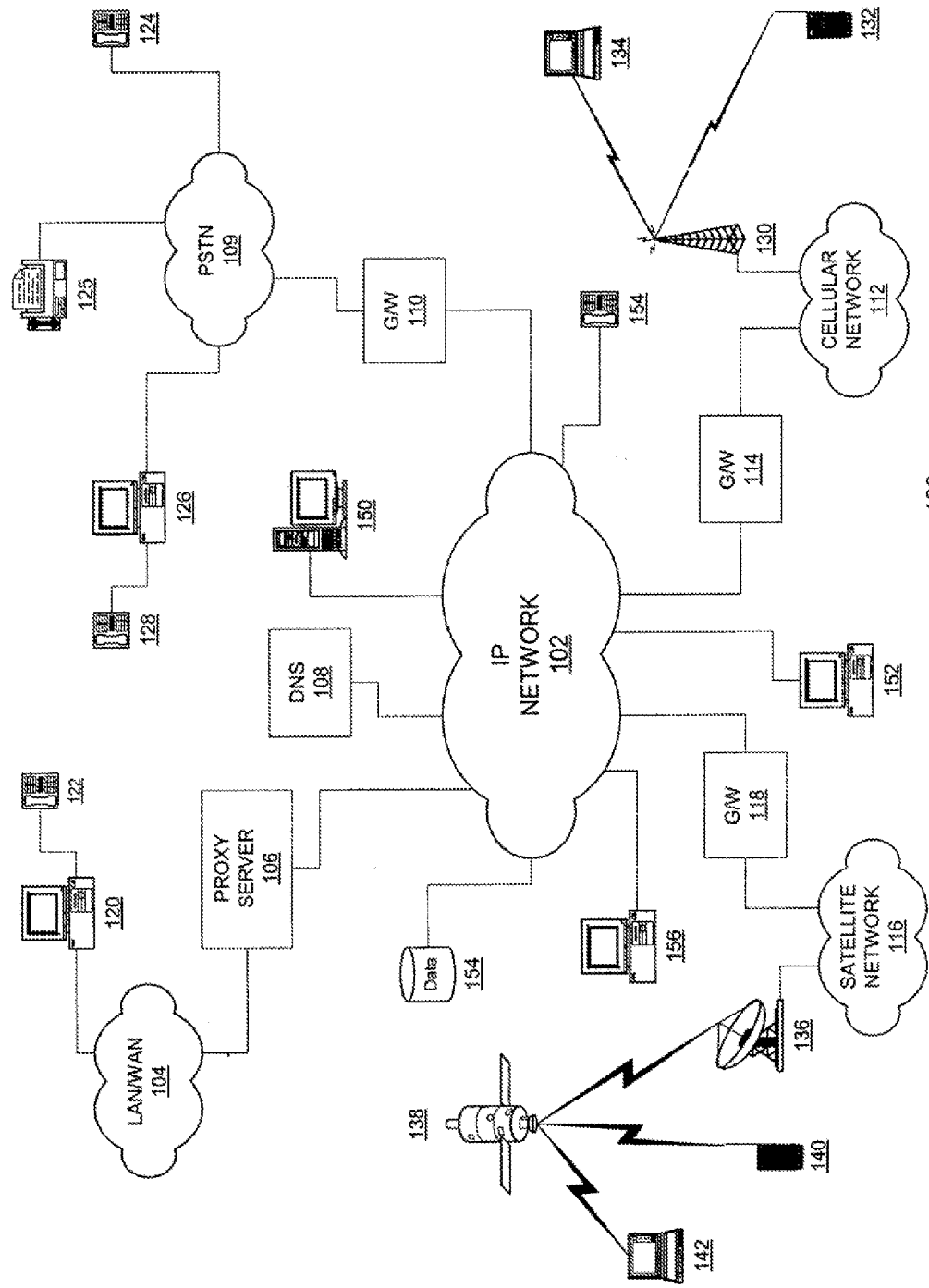
FIG. 1 depicts a system diagram illustrating a distributed data processing system in which a the present invention may be implemented.

With reference now to the figures, and in particular with reference to FIG. 1, a system diagram illustrating a distributed data processing system in which a the present invention may be implemented is depicted.

Distributed data processing system 100 is a plurality of interconnected heterogeneous networks in which the present invention may be implemented. As illustrated, distributed data processing system 100 contains an Internet Protocol (IP) network 102, a Local Area Network (LAN)/Wide Area Network (WAN) 104, the Public Switched Telephone Network (PSTN) 109, a cellular wireless network 112, and a satellite communication network 116. Networks 102, 104, 109, 112, and 116 may include permanent connections, such as wire or fiber optic cables, or temporary connections made through telephone connections.

IP network 102 may be the publicly available IP network (the Internet), a private IP network, or a combination of public and private IP networks. In any case, IP network 102 operates according to the Internet Protocol and routes packets among its many switches and through its many transmission paths. IP networks are generally known in the art to be expandable, fairly easy to use and heavily supported. Coupled to IP network 102 is a Domain Name Server (DNS) 108 to which queries may be sent, such queries each requesting an IP address based upon a Uniform Resource Locator (URL). IP network 102 supports 32 bit IP addresses as well as 128 bit IP addresses, which are currently in the planning stage.

In the depicted example, server 150 is connected to IP network 102, along with storage unit 154. In addition, clients 152 and 156 are also connected to IP network 102. These clients, 152 and 156, may be, for example, personal computers or network computers. For purposes of this application, a network computer is any computer coupled to a network, which receives a program or other application from another computer coupled to the network. In the depicted example, server 150 provides data, such as boot files, operating system images and applications, to clients 152 and 156. Server 150 may provide data to clients connected to any of networks 104, 109, 112, or 116 as well.

LAN/WAN 104 couples to IP network 102 via a proxy server 106 (or another connection). LAN/WAN 104 may operate according to various communication protocols, such as the Internet Protocol, the Asynchronous Transfer Mode (ATM) protocol, or other known packet switched protocols. Proxy server 106 serves to route data between IP network 102 and LAN/WAN 104. A firewall that precludes unwanted communications from entering LAN/WAN 104 may also be located at the location of proxy server 106.

Computer 120 couples to LAN/WAN 104 and supports communications with LAN/WAN 104. Computer 120 may employ the LAN/WAN and proxy server 106 to communicate with other devices across IP network 102. Such communications are generally known in the art and will not be further described herein except to expand upon the teachings of the present invention. As is also shown, phone 122 couples to computer 120 and may be employed to initiate IP Telephony communications with another phone or voice terminal using IP Telephony. In such an IP telephony system, a gatekeeper 152 is deployed by a service provider to manage IP telephony for its users. An IP phone 154 connected to IP network 102 (or other phone, e.g., phone 124) may communicate with phone 122 using IP telephony.

PSTN 109 is a circuit switched network that is primarily employed for voice communications, such as those enabled by a standard phone 124. However, PSTN 109 also supports the transmission of data. Data transmissions may be supported to a tone based terminal, such as a FAX machine 125, to a tone based modem contained in computer 126, or to another device that couples to PSTN 109 via a digital connection, such as an Integrated Services Digital Network (ISDN) line, an Asynchronous Digital Subscriber Line (ADSL), or another digital connection to a terminal that supports such a connection. As illustrated, a voice terminal, such as phone 128, may couple to PSTN 109 via computer 126 rather than being supported directly by PSTN 109, as is the case with phone 124. Thus, computer 126 may support IP telephony with voice terminal 128, for example.

Cellular network 112 supports wireless communications with terminals operating in its service area (which may cover a city, county, state, country, etc.). As is known, cellular network 112 includes a plurality of towers, e.g., 130, that each service communications within a respective cell. Wireless terminals that may operate in conjunction with cellular network 112 include wireless handsets 132 and wirelessly enabled laptop computers 134, for example. Wireless handsets 132 could be, for example, personal digital assistants, wireless or cellular telephones, or two-way pagers. Cellular network 112 couples to IP network 102 via gateway 114.

Wireless handsets 132 and wirelessly enabled laptop computers 134 may communicate with cellular network 112 using a wireless application protocol (WAP). WAP is an open, global specification that allows mobile users with wireless devices, such as, for example, mobile phones, pagers, two-way radios, smartphones, communicators, personal digital assistants, and portable laptop computers, to easily access and interact with information and services almost instantly. WAP is a communications protocol and application environment and can be built on any operating system including, for example, Palm OS, EPOC, Windows CE, FLEXOS, OS/9, and JavaOS. WAP provides interoperability even between different device families.

WAP is the wireless equivalent of Hypertext Transfer Protocol (HTTP) and Hypertext Markup Language (HTML). The HTTP-like component defines the communication protocol between the handheld device and a server or gateway. This component addresses characteristics that are unique to wireless devices, such as data rate and round-trip response time. The HTML-like component, Wireless Markup Language (WML), defines new markup and scripting languages for displaying information to and interacting with the user. This component is highly focused on the limited display size and limited input devices available on small, handheld devices. For example, a typical cell phone may have only a 4×10-character display with 16-gray levels and only a numeric keypad plus up/down volume keys.

Cellular network 112 operates according to an operating standard, which may be the Advanced Mobile Phone System (AMPS) standard, the Code Division Multiple Access (CDMA) standard, the Time Division Multiple Access (TDMA) standard, or the Global System for Mobile Communications or Groupe Speciale Mobile (GSM), for example. Independent of the standard(s) supported by cellular network 112, cellular network 112 supports voice and data communications with terminal units, e.g., 132 and 134.

Satellite network 116 includes at least one satellite dish 136 that operates in conjunction with a satellite 138 to provide satellite communications with a plurality of terminals, e.g., laptop computer 142 and satellite handset 140. Satellite handset 140 could also be a two-way pager. Satellite network 116 may be serviced by one or more geosynchronous orbiting satellites, a plurality of medium earth orbit satellites, or a plurality of low earth orbit satellites. In any case, satellite network 116 services voice and data communications and couples to IP network 102 via gateway 118.

FIG. 1 is intended as an example and not as an architectural limitation for the processes of the present invention. For example, distributed data processing system 100 may include additional servers, clients, and other devices not shown.

Figure 2:
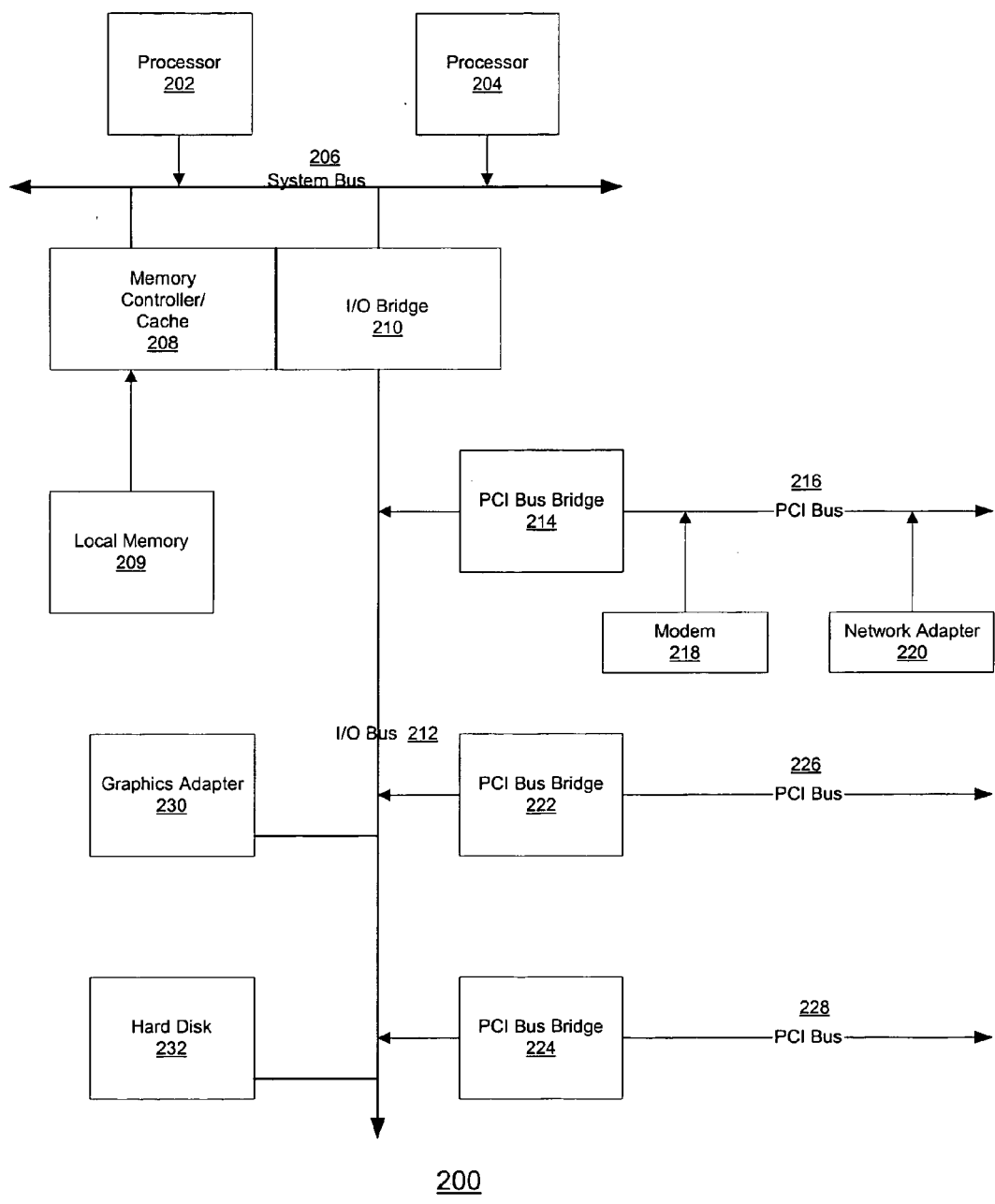
FIG. 2 depicts a block diagram of a data processing system that may be implemented as a server in accordance with the present invention.

Referring to FIG. 2, a block diagram of a data processing system which may be implemented as a server, such as server 150 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 152 and 156 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system or an Intel based machine running a Windows NT operating system.

Figure 3:
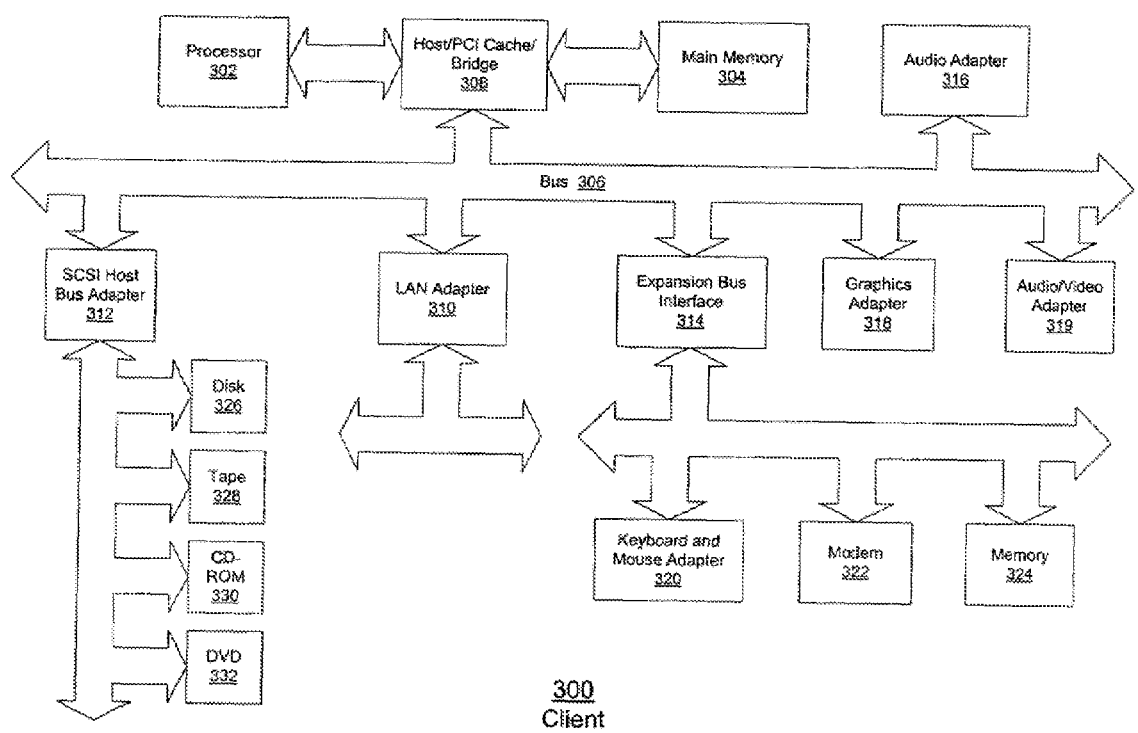
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
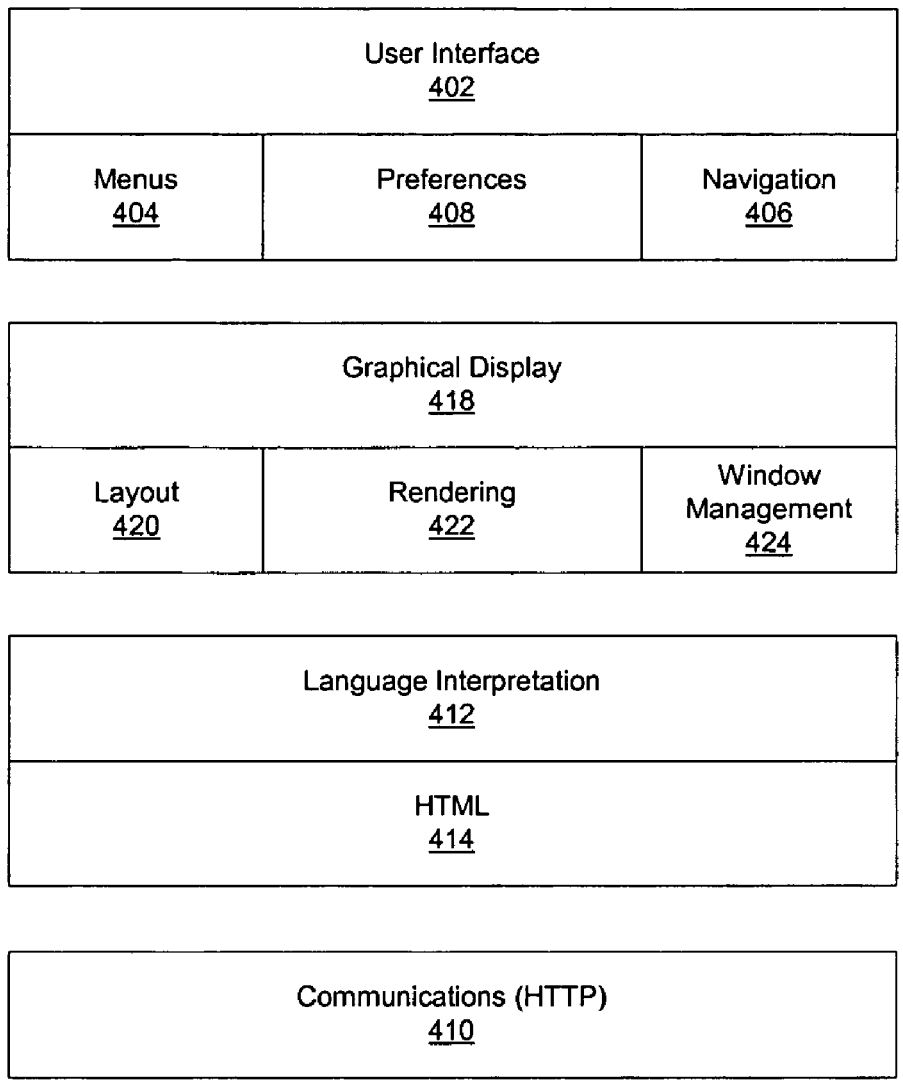
FIG. 4 depicts a block diagram of a browser program in accordance with a preferred embodiment of the present invention.

Turning next to FIG. 4, a block diagram of a browser program is depicted in accordance with a preferred embodiment of the present invention. Browser 400 includes a user interface 402, which is a graphical user interface (GUI) that allows the user to interface or communicate with browser 400. This interface provides for selection of various functions through menus 404 and allows for navigation through the navigation button 406 or selections. For example, menu 404 may allow a user to perform various functions, such as saving a file, opening a new window, displaying a history, and entering a URL. Navigation 406 allows for a user to navigate various pages and to select web sites for viewing. For example, navigation 406 may allow a user to see a previous page or a subsequent page relative to the present page. Preferences may be set through preferences 408.

Communications 410 is the mechanism with which browser 400 receives documents and other resources from a network such as the Internet. Further, communications 410 is used to send or upload documents and resources onto a network. In the depicted example, communication 410 uses HTTP. However, other protocols are possible. Documents that are received by browser 400 are processed by language interpretation 412, which includes an HTML unit 414. Language interpretation 412 will process a document for presentation on graphical display 418. In particular, HTML statements are processed by HTML unit 414 for presentation.

Graphical display 418 includes layout unit 420, rendering unit 422, and window management 424. These units are involved in presenting web pages to a user based on results from language interpretation 412.

Browser 400 is presented as an example of a browser program in which the present invention may be embodied.

Browser 400 is not meant to imply architectural limitations to the present invention. Presently available browsers may include additional functions not shown or may omit functions shown in browser 400. As used herein, the term "browser" encompasses any software application used to view or navigate for information or data (e.g., something that assist a user to browser) in a distributed data base where the distributed database is typically the internet or World Wide Web.

Figure 5:
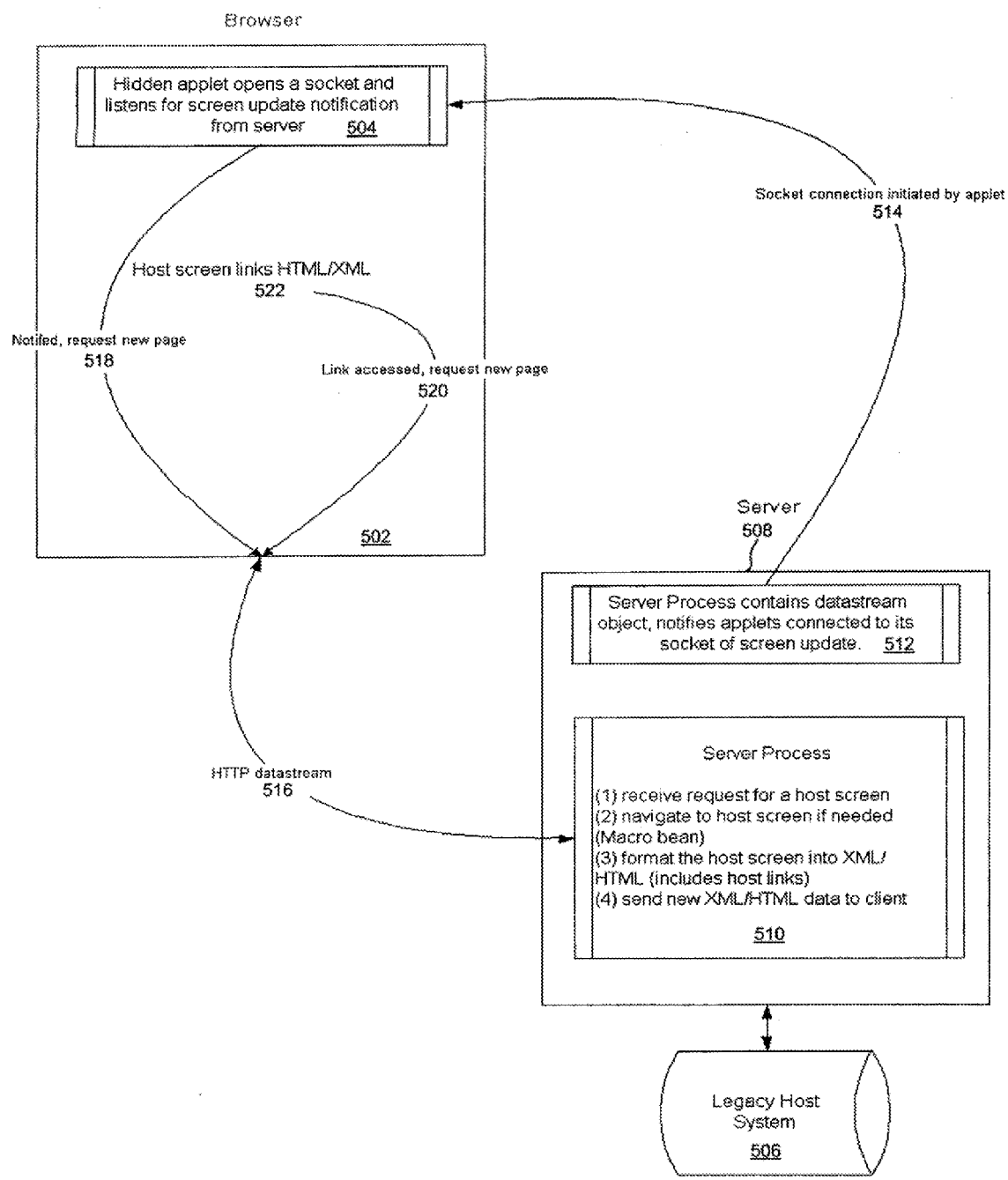
FIG. 5 depicts a block diagram illustrating a system for navigating a legacy host system according to the present invention.

Referring now to FIG. 5, a block diagram illustrating a system for navigating a legacy host system is depicted according to the present invention. A navigation system 510 resides on a web server 508 with a connection to a legacy host system 506. Web server 508 may be implemented as server 150 in FIG. 1 with legacy host system 506 located on database 154 wherein the connection between web server 508 and legacy host system 506 is provided by IP Network 102. A user communicates with navigation system 510 via browser 502 which may reside on a client such as client 108 in FIG. 1 and which may be implemented as browser 400 in FIG. 4.

Navigation system 510 renders a "system" of host screens into a web page of hot links and sends them to browser 502. A user initially acquires access to a legacy host screen by typing in a universal resource locator (URL) that is the host linking application address of server 508 into browser 502. In this example, the user types the URL http://www.mycompany.com/hostlinker to access server 502, which provides access to legacy host system 506. Once the initial URL is accessed, a new session is open and the first screen is formatted into HTML with hot links and user information in either a cookie or form data is passed back to the browser along with this first screen. This first screen is usually a logon screen. The user information is sent back and forth with each request and helps to map requests to host sessions open on the server. All the hot links in the pages sent to the user point back to http://www.mycompany.com/hostlinker.

Figure 6:
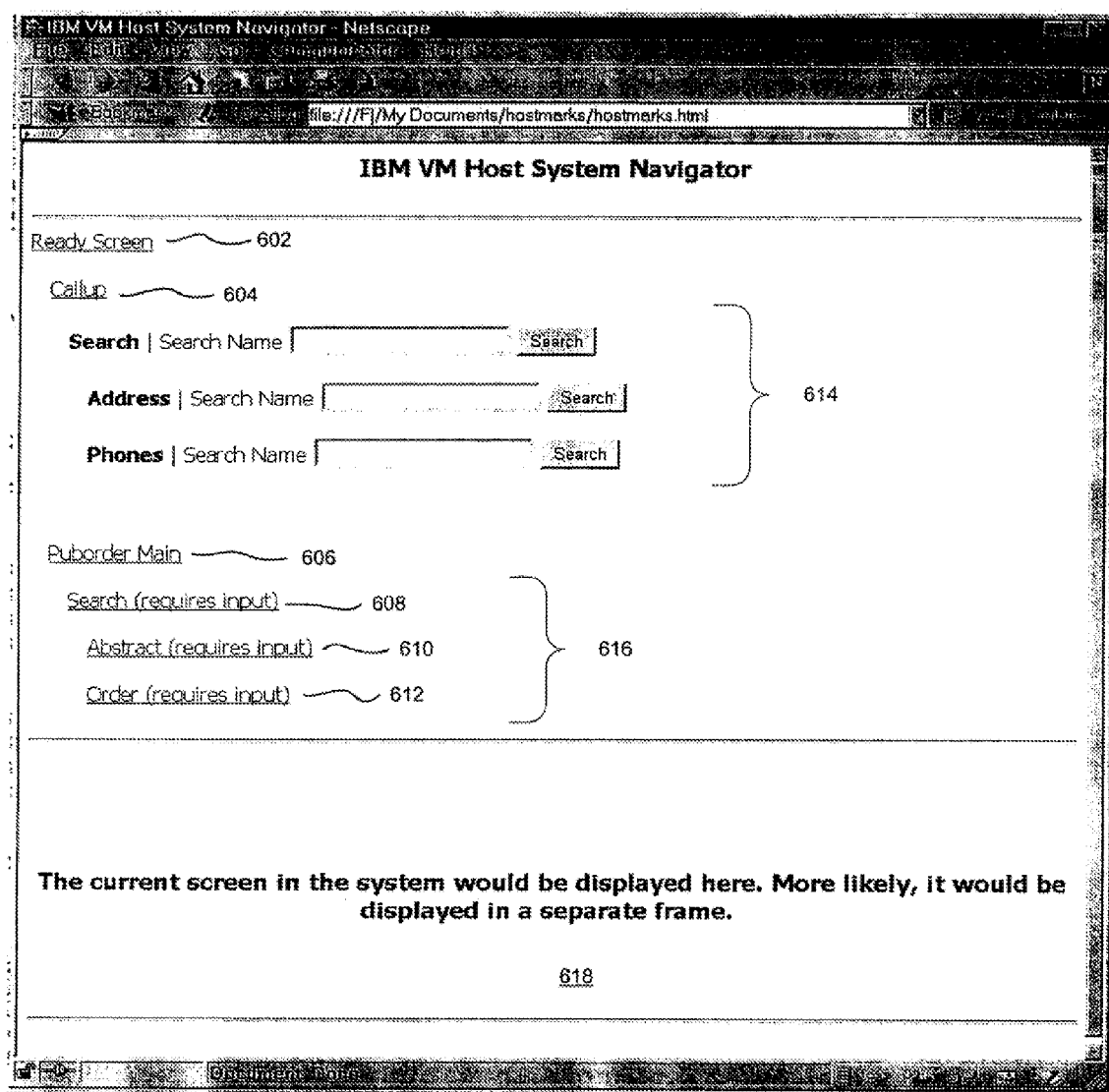
FIG. 6 depicts an example of a browser window containing links to screens within a legacy host system in accordance with the present invention.

Browser 502 displays the list of HREF style hot links 522 that represent each screen in the host system 506 as received from navigation system 510. An example of such a web page style navigation window is illustrated in FIG. 6. Each screen within the host system to which a user might wish to navigate is represented by a selectable "hot" link 602-612, which, when selected, such as by clicking with a mouse, sends a request to navigation system 510 to retrieve the appropriate screen within host system 506.

Note, if variable data is needed to navigate from screen to screen, the link will be presented as a submittable form and will contain text fields the user should fill in for the variable data. There are two possible options the user can choose with respect to entering data as illustrated in FIG. 6.

In one option, as illustrated in callup section 614, the submittable form is presented to the user along with the links such that if the user wishes to retrieve that particular screen, the user must enter the data in the submittable form. In another option as illustrated in section 616, the links are presented to the user without a submittable form but with an indication that user input will be required to access those screens. If the user selects one of these screens, then the navigation system 510 will generate and send a submittable form to the user for entry of the variable data needed to access the legacy host screen specified by the user. Once the user has entered the data, he will select a submit or search option to send the entered data back to navigation system 510, which will use the variable data to access the requested legacy host screen.

Referring still to FIG. 6, the current screen within the legacy host system is displayed to the user in box 618 within the frame window. The contents of box 618 change as the user navigates within the legacy host system. In an alternate embodiment, the contents of the current screen from the legacy host system are displayed in a separate frame window from the navigator window 600.

Referring again to FIG. 5, once a link from host screen links 522 is selected, a request for a new screen 520 is sent to navigation system 510 via a hypertext transfer protocol (HTTP) datastream 516. As the request for a new screen is sent, a hidden applet 504 within browser 502 is also notified 518 of the request for a new screen and opens a socket connection with datastream object 512 within server 508.

Once navigation system 510 receives the request for a host screen, it navigates to the host screen. If a direct connection exists between the current screen and the host screen, then a macro bean within navigation system 510 enters the appropriate data to access the host screen. If several screens must be accessed in order to access the host screen, then the appropriate entries are made at each screen such that access to the host screen is attained. If variable data is needed to proceed through some of the intermediate screens or for direct access to the host screen, that variable data is acquired from the user as mentioned above either through sending a submittable form requesting the appropriate data or by having the submittable form as part of the initial screen containing the links to the various screens within the legacy host system.

The links between each screen in the macro within navigation system 510 are not merely connections to verify a next screen as current systems provide. Rather, the macro bean within the navigation system 510 contains the intelligence to record and use the links for jumping over multiple screens to get to the target screen if the ultimate connections exists and then stopping at the target screen. In other words, each next screen specified in a macro screen block will contain default actions for navigating from the current screen block to the next. An example of this can be seen with the <nextscreen> tags in the sample macro depicted in FIGS. 7A-7C which will be discussed in more detail below.

Once access to the host screen has been acquired, the host screen is retrieved from legacy host system 506 and reformatted into a hypertext language such as an extensible markup language (XML) or a hypertext markup language (HTML) including host links such that the screen may be displayed to the user through browser 502 as a web page.

Datastream object 512 notifies hidden applet 504 of a screen update and navigation system 510 sends the requested host screen formatted in a markup language to browser 502 via HTTP datastream 516. Browser 502 then displays the requested legacy host screen to the user.

Thus, the present invention provides access via the Internet to applications, services and/or data that were created without contemplation of providing these applications, services and/or data to users via the Internet. The present invention also allows visualization/modeling of a legacy host system using the well understood "hot" link paradigm for navigating between screens. Furthermore, the present invention allows the user to browse around screens in the Macro doing away with the concept of playing macros to accomplish specific tasks. In essence, one big macro that represents the entire accessible host system is always playing. Thus, users are allowed to use a legacy host system without training in or knowledge of how to issue the right host commands at the right screens. The user simply browses around the system much as one would browse around linked Internet pages on the World Wide Web (WWW), concentrating on the data rather than on the navigation.

The present invention also allows the user to skip past several screens, thus having only the screens of interest to the user presented to the user. This is great for palm devices and other wireless devices where bandwidth is at a premium. For example, the user can skip directly from the ready prompt to the puborder search without having to see the five screens in between. Other advantages will be obvious to those skilled in the art.

Figure 7A:
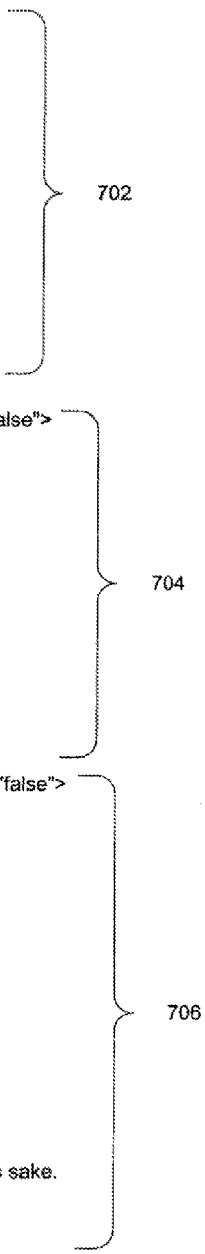

Referring now to FIGS. 7A-7C, an example of a macro suitable for providing navigation around legacy host system is depicted in accordance with the present invention. In the present example, the macro bean corresponds to the IBM Host On-Demand (HOD) Macro bean. A macro bean is a programming object that, when connected to a host terminal emulator programming object (i.e., IBM HOD's Session bean), automatically navigates through host screens based on the user coded script provided to the Macro bean (i.e., the XML code). Each of blocks 702-718 contains XML code for navigating from a specific screen in the legacy host system to other screens within the legacy host system. Each of blocks 702-718 contain an entry for the screen name, whether the screen is transient, and whether the screen is an entry or an exit screen. Each of blocks 702-718 only executes if the current screen from which a request for a new screen was made corresponds to the screen name tag at the top of the block. The transient tag indicates whether the screen is displayed to the user. If the transient tag is true, then the appropriate entries are made to the screen, but the screen is not displayed to the user. Thus, as mentioned above, the user is not burdened with viewing numerous screens unnecessarily and bandwidth is saved by not transmitting these screens to the client.

Each of blocks 702-712 also contains a nextscreen tag which determines which screen the user wishes to see. For example, in block 704, there is a nextscreen tag for "Puborder.search" and for "ready." Depending on the choices selected by the user, an input value of "[pf9]" or and input value of "[pf3]" each corresponding to a function key selection will be sent to the legacy host system such that the appropriate screen may be retrieved. Thus, the requested screen is retrieved without the user needing to know which function keys or keystrokes are required to navigate to the appropriate screen. That information is contained within the macro.

It should be noted that for brevity, ease of explanation, and simplicity, some screens, including the puborder search result screen and the callup address result screen, have been omitted from the macro. It should also be noted that this macro is given merely as an example. Other macros may be created using the methods of the present invention to provide navigation through other legacy host systems. Typically, each legacy host system will have its own macro for navigating through that system, although it is possible to combine each macro for each legacy host system serviced by a server such as server 508 into a single giant macro.

Figure 8:
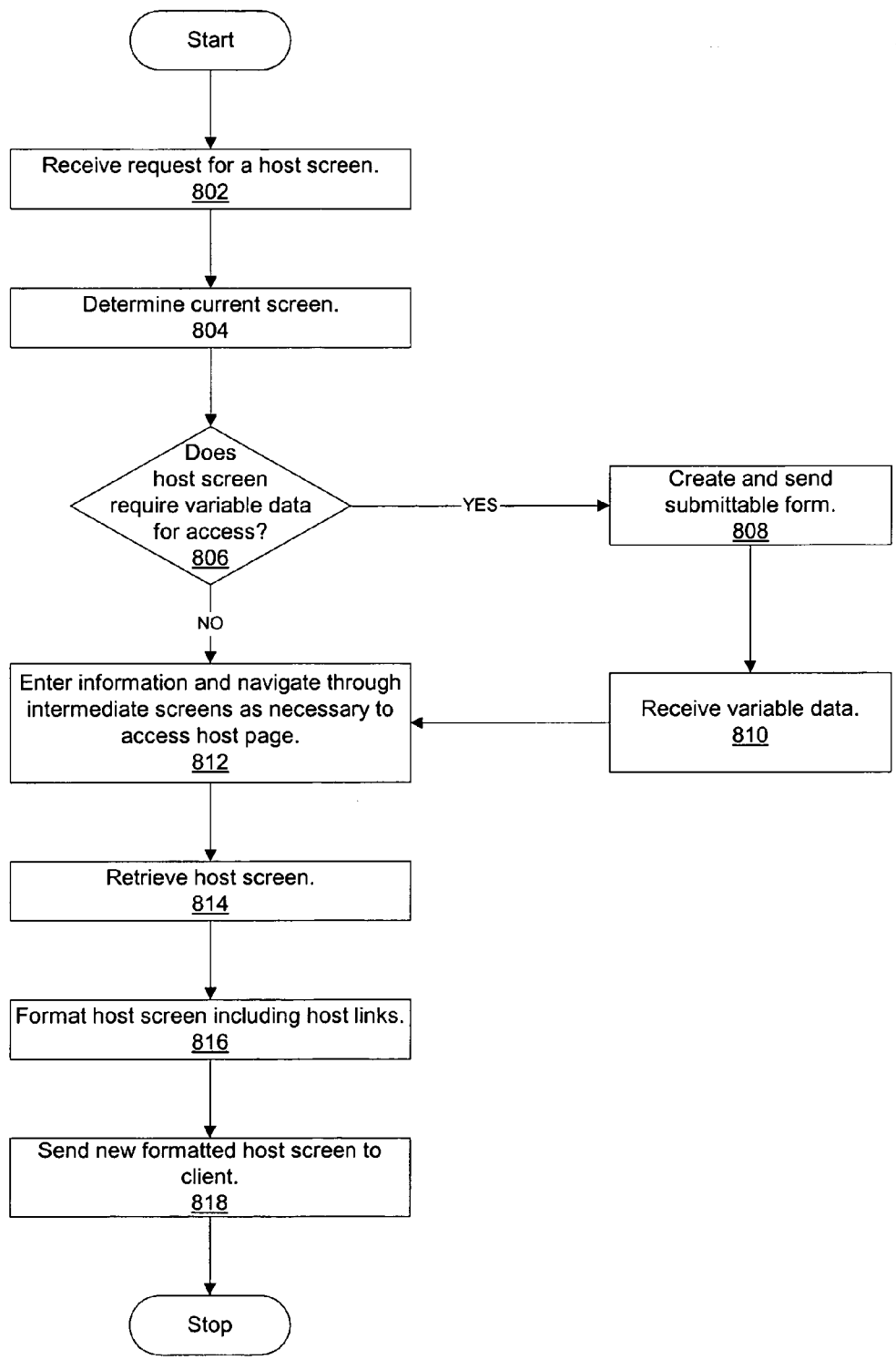
FIG. 8 depicts a flowchart illustrating an overview of a method on a server for navigating and retrieving a legacy host screen according to the present invention.

Referring now to FIG. 8, a flowchart illustrating an overview of a method on a server for navigating and retrieving a legacy host screen is depicted according to the present invention. To start, the server receives a request for a host screen from a client (step 802). If this is the initial request for the legacy host system by the client, then the client is sent the ready screen containing the hyperlinks to other screens within the legacy host system. Otherwise, the server determines the current screen displayed to the client (step 804). Next, the server determines whether the host screen to which the user desires access requires variable data to access (step 806). If it does, then a submittable form with text fields where the appropriate data may be entered by the user is created and sent to the client (step 808). The server then waits until the data entered by the user is received (step 810).

If the host screen does not require variable data for access or if the variable data has been received from the client, the server enters the appropriate data and commands to acquire access to the host screen navigating through various intermediate screens if necessary (step 812). The host screen is then retrieved (step 814) and the server formats the host screen, including hyperlinks to other screens within the legacy host system, into a markup language, such as, for example, XML or HTML, which can be read by a browser (step 816). The server then sends the newly formatted host screen to the client to be displayed to the user (step 818) at which point the process ends.

Figure 9:
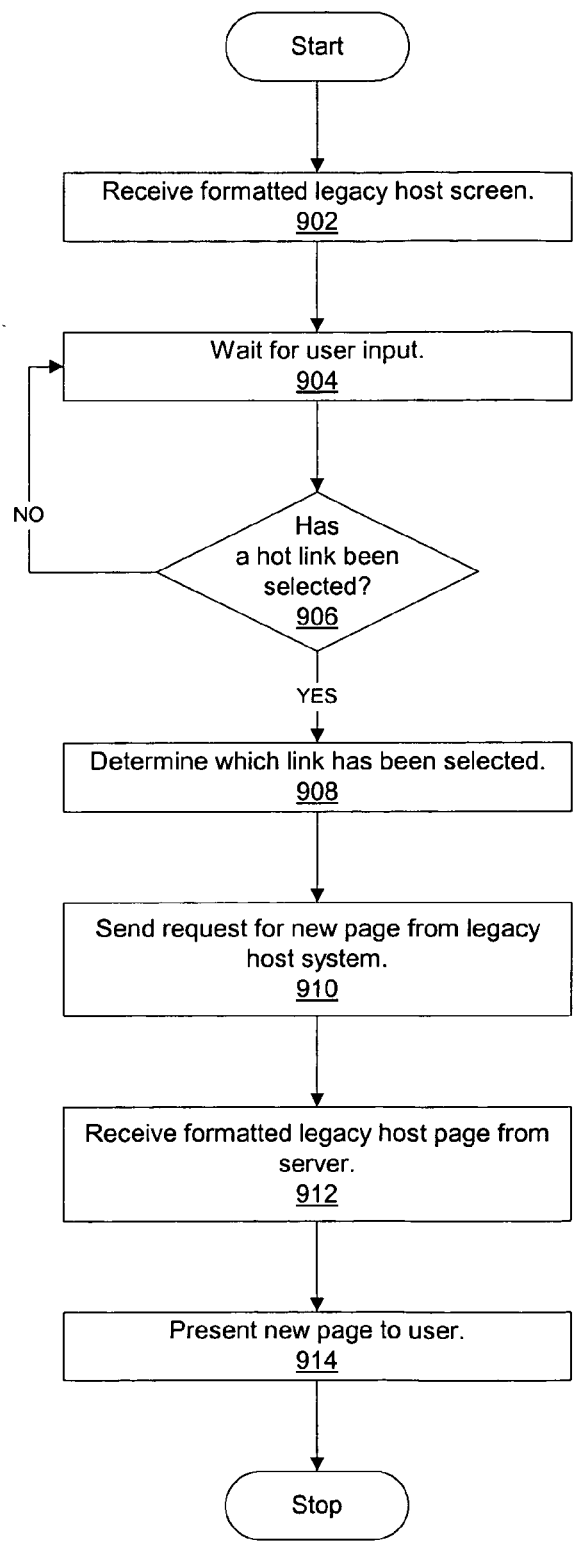
FIG. 9 depicts a flowchart illustrating a method of navigating and viewing legacy host screens from the perspective of a client computer in accordance with the present invention.

Referring now to FIG. 9, a flowchart illustrating a method of navigating and viewing legacy host screens from the perspective of a client computer is depicted in accordance with the present invention. To start, the user sends a request to the server for access to the legacy host system. The client then receives a formatted legacy host screen containing hyperlinks to the various screens within the legacy host system that the user might wish to view (step 902). Next, the client browser waits for user input (step 904). The browser determines whether a hyperlink (or "hot" link) has been selected by the user (step 906). If not, the browser continues to wait for user input (step 904).

If a hyperlink has been selected by the user, then the browser determines which link has been selected (step 908) and sends a request for the newly selected host screen from the legacy host system to the server (step 910). The browser then waits until it receives from the server the formatted legacy host screen requested by the user (step 912) and then displays this screen to the user (step 914).

This information may be displayed in the bottom half of the window frame in which the navigation screen is located or may be displayed in a separate window frame. The hyperlinks to other screens within the legacy host system may be intermingled and displayed along with the data from the legacy host system or the two may be separated and displayed separately. Other methods of presenting the data from the legacy host system and the navigation tools to the user are also possible and within the scope of the present invention.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method in a data processing system for navigating screens in a legacy host system, comprising the steps of:
   receiving, from a client, a request for a host screen;
   navigating to the host screen;
   retrieving the host screen;
   formatting the host screen into a formatted host screen from a non-markup language to a markup language, wherein the formatted host screen displays selectable links to other screens within host system; and
   sending the formatted host screen to the client.

2. The method as recited in claim 1, wherein the step of navigating to the host screen comprises retrieving at least one intermediate screen in order to retrieve the host screen.

3. The method as recited in claim 1, further comprising:
   responsive to a determination that variable data is needed to navigate to the host screen, sending to the client a submittable form containing text fields that may be filled in by a user; and
   responsive to receiving the variable data from the client, using the variable data to retrieve the host screen.

4. The method as recited in claim 1, wherein the client is a portable data processing system.

5. The method as recited in claim 4, wherein the portable data processing system is a wireless system.

6. The method as recited in claim 2, wherein the intermediate screen is not presented to the user.

7. The method as recited in claim 2, wherein appropriate entries are made in the at least one intermediate screen in order to navigate to the host screen.

8. The method as recited in claim 1, wherein the markup language is an extensible markup language.

9. The method as recited in claim 1, wherein the markup language is a hypertext markup language.

10. A computer program product including a plurality of computer executable instructions stored in computer readable storage media for use in a data processing system for navigating screens in a legacy host system, the computer program product comprising:
    first instructions for receiving, from a client, a request for a host screen;
    second instructions for navigating to the host screen;
    third instructions for retrieving the host screen;
    fourth instructions for formatting the host screen into a formatted host screen from a non-markup language to a markup language, wherein the formatted host screen displays selectable links to other screens within a host system; and
    fifth instructions for sending the formatted host screen to the client.

11. The computer program product as recited in claim 10, wherein the step of navigating to the host screen comprises retrieving at least one intermediate screen in order to retrieve the host screen.

12. The computer program product as recited in claim 10, further comprising:
    sixth instructions, responsive to a determination that variable data is needed to navigate to the host screen, for sending to the client a submittable form containing text fields that may be filled in by a user; and
    seventh instructions, responsive to receiving the variable data from the client, for using the variable data to retrieve the host screen.

13. The computer program product as recited in claim 10, wherein the client is a portable data processing system.

14. The computer program product as recited in claim 13, wherein the portable data processing system is a wireless system.

15. The computer program product as recited in claim 11, wherein the intermediate screen is not presented to the user.

16. The computer program product as recited in claim 11, wherein appropriate entries are made in the at least one intermediate screen in order to navigate to the host screen.

17. The computer program product as recited in claim 10, wherein the markup language is an extensible markup language.

18. The computer program product as recited in claim 10, wherein the markup language is a hypertext markup language.

19. A system for navigating screens in a legacy host system, comprising:
    means for receiving, from a client, a request for a host screen;
    means for navigating to the host screen;
    means for retrieving the host screen;
    means for formatting the host screen into a formatted host screen from a non-markup language into a markup language, wherein the formatted host screen displays selectable links to other screens within a host system; and
    means for sending the formatted host screen to the client.

20. The system as recited in claim 19, wherein the step of navigating to the host screen comprises retrieving at least one intermediate screen in order to retrieve the host screen.

21. The system as recited in claim 19, further comprising:
    means, responsive to a determination that variable data is needed to navigate to the host screen, for sending to the client a submittable form containing text fields that may be filled in by a user; and
    means, responsive to receiving the variable data from the client, for using the variable data to retrieve the host screen.

22. The system as recited in claim 19, wherein the client is a portable data processing system.

23. The system as recited in claim 22, wherein the portable data processing system is a wireless system.

24. The system as recited in claim 20, wherein the intermediate screen is not presented to the user.

25. The system as recited in claim 20, wherein appropriate entries are made in the at least one intermediate screen in order to navigate to the host screen.

26. The system as recited in claim 19, wherein the markup language is an extensible markup language.

27. The system as recited in claim 19, wherein the markup language is a hypertext markup language.

28. A macro bean including a plurality of computer executable instructions stored in a memory for providing navigation between screens within a legacy host system, the macro bean comprising:
   first instructions for receiving a request for a requested host screen from a legacy host system;
   second instructions for determining the current host screen;
   third instructions for navigating to the requested host screen, wherein intermediate host screens between the current host screen and the requested host screen are unsent to a client;
   fourth instructions for formatting the host screen into a formatted host screen from a non-mark-up language to a markup language, wherein the formatted host screen displays selectable links to other screens within host system; and
   fifth instructions for sending the formatted host screen to the client.

29. The macro bean as recited in claim 28, further comprising fifth instructions for entering appropriate data at intermediate host screens in order to access the requested host screen.

30. The macro bean as recited in claim 28, wherein variable data received from a client is entered appropriately into one or more of the intermediate host screens.

* * * * *